(12) United States Patent
Rao et al.

(10) Patent No.: US 12,716,486 B2
(45) Date of Patent: Aug. 25, 2026

(54) CONTROLLER AND METHOD TO ASSIST QUICK GEARSHIFT IN A VEHICLE USING GEAR POSITION SENSOR

(71) Applicants: Robert Bosch GmbH, Stuttgart (DE); Bosch Limited, Bangalore (IN)

(72) Inventors: Murali Jagannath Rao, Bangalore (IN); Cheradiyaniyil Abhijith Sabu, Bangalore (IN); Hemant Kumar, Bangalore (IN)

(73) Assignees: Robert Bosch GmbH, Stuttgart (DE); Bosch Limited, Karnataka (IN)

( * ) Notice: Subject to any disclaimer, the term of this patent is extended or adjusted under 35 U.S.C. 154(b) by 0 days.

(21) Appl. No.: 18/867,181

(22) PCT Filed: May 2, 2023

(86) PCT No.: PCT/EP2023/061487
§ 371 (c)(1),
(2) Date: Nov. 19, 2024

(87) PCT Pub. No.: WO2023/232368
PCT Pub. Date: Dec. 7, 2023

(65) Prior Publication Data

US 2025/0369511 A1 Dec. 4, 2025

(30) Foreign Application Priority Data

May 31, 2022 (IN) ............................ 202243031093

(51) Int. Cl.
*F16H 61/04* (2006.01)
*F16H 59/04* (2006.01)

(52) U.S. Cl.
CPC ....... *F16H 61/0437* (2013.01); *F16H 59/044* (2013.01)

(58) Field of Classification Search
CPC .......................... F16H 61/0437; F16H 59/044
See application file for complete search history.

(56) References Cited

U.S. PATENT DOCUMENTS

| | | | | |
|---|---|---|---|---|
| 5,571,059 | A * | 11/1996 | Desautels | B60W 10/11 477/111 |
| 2019/0264803 | A1 | 8/2019 | Matsukawa et al. | |

FOREIGN PATENT DOCUMENTS

| | | | |
|---|---|---|---|
| EP | 3 800 381 | A1 | 4/2021 |

OTHER PUBLICATIONS

International Search Report corresponding to PCT Application No. PCT/EP2023/061487, mailed Jul. 21, 2023 (English language document) (3 pages).

* cited by examiner

*Primary Examiner* — Huan Le
(74) *Attorney, Agent, or Firm* — Maginot, Moore & Beck LLP

(57) ABSTRACT

The vehicle comprises a Gearbox Position Sensor (GPS). The controller is adapted to receive input signals from the GPS, compare a value of the input signal with a predetermined threshold value, and activate a shift assist functionality based on the comparison. The value of the input signal is any one selected from a group comprising voltage and an angle. Further, the shift assist functionality comprises adjustment of engine operation by at least one of Electronic Throttle Control, a fuel injection control, ignition control. The controller is in connection with the Electronic Throttle Body, a fuel injector and an ignition system respectively for the adjustment/control of the engine operation. A robust solution of achieving quick shift functionality is achieved by using the existing GPS of the vehicle. The implementation cost of new and existing vehicle is reduced.

8 Claims, 2 Drawing Sheets

CONTROLLER AND METHOD TO ASSIST QUICK GEARSHIFT IN A VEHICLE USING GEAR POSITION SENSOR

This application is a 35 U.S.C. § 371 National Stage Application of PCT/EP2023/061487, filed on May 2, 2023, which claims the benefit of priority to Serial No. IN 202243031093, filed on May 31, 2022 in India, the disclosures of which are incorporated herein by reference in their entirety.

The present disclosure relates to operation of quick gearshift in a vehicle, and particularly relates to a controller and a method to assist quick gearshift in a vehicle using gearbox position sensor.

BACKGROUND

Vehicles have to be equipped with a separate device (shift assist sensor) in order to allow clutch-less quick gear shifting in manual transmissions. These shift assist sensor are widely employed in motorcycles segment. The drivers/riders intending to make a gearshift in the vehicles that employ shift assist sensor could directly engage the gear lever to cause the gearshift without the need to use the clutch. The output of the shift assist sensor to the EMS control unit depends upon the actuation of sensor assembly through application of pressure on to the gear lever by the driver/rider. However, these vehicles deployed with shift assist sensor do experience problem at times. Further, the requirement of having a separate device for quick gearshift without the need to apply clutch is expensive from an economic perspective since it normally requires an extra shift assist sensor specific for this purpose.

In many occasions, the driver or rider when intending to make a gearshift do not apply sufficient pressure on gear lever or shift assist sensor does not pick up the driver/rider's request to translate it as desired output for gearshift actuation or considerable delay in producing the output. This affects the gearshift operation. In other times, it is also a problem of shift assist sensor to produce output to cause actuation of gearshifts even without an actual intention of gearshift from the driver or rider's end because of play in the gearbox assembly or inadvertent pressure application on gear lever by the driver/rider. This is one another practical causes for unintended intervention gearshift operation and brings bad driving/riding experience.

Therefore, a need exists for a robust solution to assist driver/rider through gearshift operation in a vehicle without the need to engage the clutch and to assist driver/rider through quick gearshift operation without having to include a separate device/sensor in the vehicle.

A patent literature 201644029183 discloses a gear-changing apparatus for actuating a manual gearbox of a motorcycle for carrying out a gear change with the clutch engaged. An apparatus and system for actuating a manual gearbox, particularly of a motorcycle having a drive engine, and for carrying out a gear change while the clutch is engaged between the drive engine and the manual gearbox. The apparatus has a selector shaft, which can be actuated rotationally, and a gear-selector drum, which can be actuated rotationally. The gear-changing apparatus has a gear-change lever provided for actuating the selector shaft, and is adapted for influencing the output torque of the drive engine. One or more magnetic sensor(s), such as Hall effect sensors, are provided for sensing rotational actuation of the selector shaft and, optionally, for sensing rotational actuation of the gear selector drum. The sensor(s) send a signal to a controller and mechanisms known for affecting a change in gear to a lower or higher gear.

SUMMARY

A controller to assist quick gearshift in a vehicle, which includes a Gearbox Position Sensor (GPS), is adapted to receive input signals from the GPS, compare a value of the input signal with a predetermined threshold value, and activate a shift assist functionality based on the comparison.

BRIEF DESCRIPTION OF THE DRAWINGS

An embodiment of the disclosure is described with reference to the following accompanying drawing.

DETAILED DESCRIPTION

Figure 1:
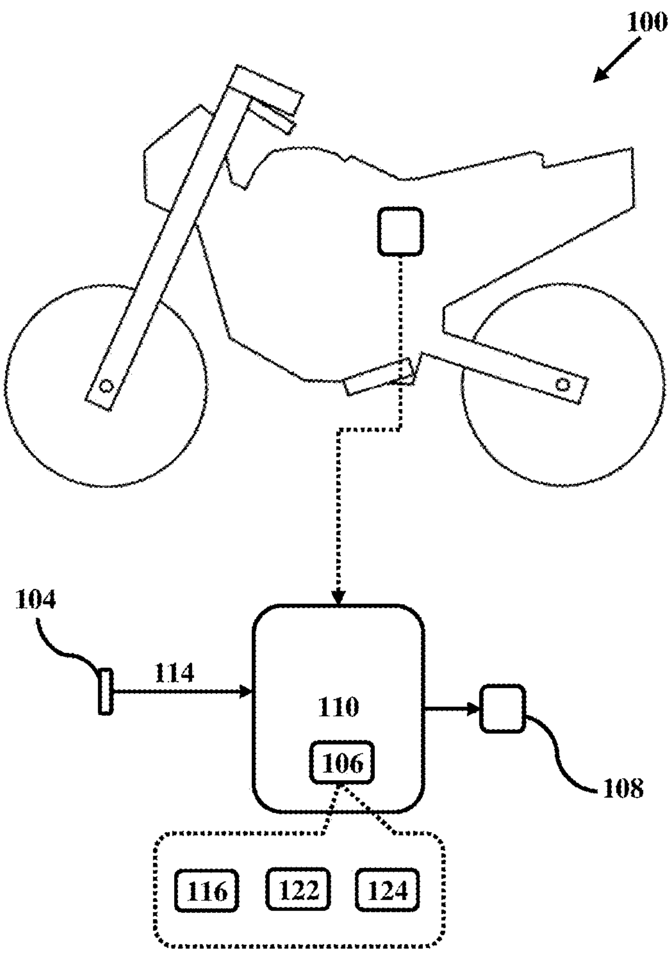
FIG. 1 illustrates a block diagram of the controller to assist quick gear shift in a vehicle, according to an embodiment of the present disclosure.

FIG. 1 illustrates a block diagram of the controller to assist quick gear shift in a vehicle, according to an embodiment of the present disclosure. The vehicle 100 comprising a Gearbox Position Sensor (GPS) 104. The controller 110 is adapted to receive input signals 114 from the GPS 104, characterized in that compare a value of the input signal 114 with a predetermined threshold value 122, and activate a shift assist functionality 116 based on the comparison. The value of the input signal 114 is any one selected from a group comprising voltage and an angle or any other form of sensor input having continuous analog signals or digital signals. Further, the shift assist functionality 116 comprises adjustment of engine operation by at least one control operation selected from a group comprising an Electronic Throttle Control, a fuel injection control, and an ignition control. The controller 110 is in connection with the at least one control means 108 selected from a group comprising an Electronic Throttle Body (ETB), a fuel injector and an ignition system respectively for the adjustment/control of the engine operation.

The shift assist functionality 116 comprises use of the controller 110, to control the air flow by controlling the electronic throttle, to control fuel injection quantity by controlling the fuel injector, to control ignition pattern by controlling the ignition system, and the like. Further, the predetermined threshold value 122 is different for each gear present in a gearbox of the vehicle 100, i.e., different for different gears.

The controller 110 comprises memory element 106 such as Random Access Memory (RAM) and/or Read Only Memory (ROM), Analog-to-Digital Converter (ADC) and vice-versa Digital-to-Analog Convertor (DAC), clocks, timers and at least one processor (capable of implementing machine learning) connected with each other and to other components through communication bus channels. The memory element 106 is pre-stored with logics or instructions or programs or applications and/or threshold values 122, which is/are accessed by the at least one processor as per the defined routines. The internal components of the controller 110 are not explained for being state of the art, and the same must not be understood in a limiting manner. The controller 110 may also comprise communication units to communicate with a server or cloud through wireless or wired means such as Global System for Mobile Communications (GSM), 3G, 4G, 5G, Wi-Fi, Bluetooth, Ethernet, serial networks and the like. The controller 110 is any one of the Engine Management System (EMS) controller, an external controller which is interfaced with the EMS such as over Controller Area Network (CAN).

In accordance to an embodiment of the present disclosure, the controller 110 is implementable in vehicle 100 comprising a two-wheeler such as a motorcycle, a moped, etc. In general, the controller 110 is usable in those vehicles 100 which involves manual change in gears such as quad bikes, snow mobiles, water sports or power sports vehicles.

In accordance to an embodiment of the present disclosure, the controller 110 to assist quick gearshift in the vehicle 100 is provided. The vehicle 100 comprises the gearbox position sensor 104. The controller 110 adapted to, receive input signals 114 from the gearbox position sensor 104, enable the shift assist functionality 116 by comparing received input signals 114 from the gearbox position sensor 104 and the predetermined first threshold 122, determine rate of change in voltage of the gearbox position sensor 104 based on the received input signals 114, activate the shift assist functionality 116 by comparing the determined rate of change in voltage of the gearbox position sensor 104 and a predetermined second threshold 124, and actuate gearshift based on the shift assist functionality 116, characterized in that, the controller 110 configured to consider only the input signal 114 to activate the shift assist functionality 116. The rate of change of input signal 114 is ignored.

In accordance to an embodiment of the present disclosure, the controller 110 to assist quick gearshift in the vehicle 100 is provided. The vehicle 100 comprises the gearbox position sensor 104. The controller 110 adapted to, receive input signals 114 from the gearbox position sensor 104, enable the shift assist functionality 116 by comparing received input signals 114 from the gearbox position sensor 104 and the predetermined first threshold 122, determine rate of change in voltage of the gearbox position sensor 104 based on the received input signals 114, characterized in that, activate the shift assist functionality 116 based on the comparison of the input signal 114 against the first predetermined threshold. The rate of change of input signal 114 is ignored.

Figure 2:
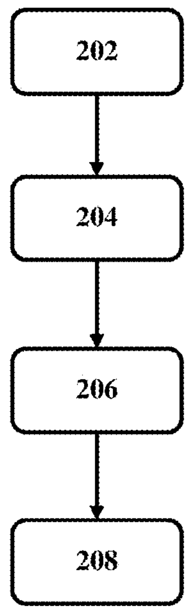
FIG. 2 illustrates a method for assisting quick gear shift in the vehicle, according to an embodiment of the present disclosure.

FIG. 2 illustrates a method for assisting quick gear shift in the vehicle, according to an embodiment of the present disclosure. The vehicle 100 comprising the Gearbox Position Sensor (GPS) 104 connected to the controller 110, the method comprises plurality of steps of which a step 202 comprises receiving, by the controller 110, input signals 114 from the GPS 104. The method is characterized by a step 204 which comprises comparing, by the controller 110 value of the input signal 114 with the predetermined threshold value 122. A step 206 comprises activating, by the controller 110, the shift assist functionality 116 based on the comparison. The value of the input signal 114 is any one selected from the group comprising voltage and an angle or any other form of sensor input. A step 208 comprises adjusting/controlling engine operation by at least one control operation selected from a group comprising the Electronic Throttle Control, the fuel injection control, and the ignition control as per the shift assist functionality 116. The controller 110 performs the method steps and is in connection with the at least one control means 108 selected from a group comprising the Electronic Throttle Body (ETB), the fuel injector and the ignition system. Further, the predetermined threshold value 122 is different for each gear present in a gearbox of the vehicle 100, i.e., different for different gears.

In accordance to an embodiment of the present disclosure, the controller 110 and the method provides a robust solution of achieving quick shift functionality with use of GPS 104 which already exists in the vehicle 100. The cost of implementation of the controller 110 and the method in new and existing vehicle 100 is less as only the controller 110 as per the present disclosure needs to be installed or the existing controller 110 need to be updated.

It should be understood that embodiments explained in the description above are only illustrative and do not limit the scope of this disclosure. Many such embodiments and other modifications and changes in the embodiment explained in the description are envisaged. The scope of the disclosure is only limited by the scope of the claims.

We claim:

1. A controller to assist quick gearshift in a vehicle, said vehicle comprising a Gearbox Position Sensor (GPS), said controller adapted to:

receive input signals from said GPS;

compare a value of said input signals with a predetermined threshold value, and activate a shift assist functionality based on said comparison.

2. The controller as claimed in claim 1, wherein said value of said input signals is selected from a group comprising voltage and an angle.

3. The controller as claimed in claim 1, wherein said shift assist functionality comprises adjustment of engine operation by at least one control operation selected from a group consisting of an Electronic Throttle Control, a fuel injection control, and ignition control.

4. The controller as claimed in claim 1, wherein said predetermined threshold value is different for each gear present in a gearbox of said vehicle.

5. A method for assisting quick gearshift in a vehicle, said vehicle comprising a Gearbox Position Sensor (GPS) connected to a controller, the method comprising:

receiving, by said controller, input signals from said GPS;

comparing, by said controller, value of said input signals with a predetermined threshold value; and activating, by said controller, a shift assist functionality based on said comparison.

6. The method as claimed in claim 5, wherein said value of said input signals is selected from a group consisting of voltage and an angle.

7. The method as claimed in claim 5, wherein said shift assist functionality comprises adjusting/controlling engine operation by at least one control operation selected from a group consisting of an Electronic Throttle Control, a fuel injection control, and an ignition control.

8. The method as claimed in claim 5, wherein said predetermined threshold value is different for each gear present in a gearbox of said vehicle.

* * * * *